United States Patent
Philibert et al.

[15] 3,655,907
[45] Apr. 11, 1972

[54] CONDUIT CABLE SEAL

[72] Inventors: Robert A. Philibert, Rockville Centre; Frank L. Browne, Wantagh, L. I., both of N.Y.

[73] Assignee: O.Z. Electrical Manufacturing Company, Inc., New York, N.Y.

[22] Filed: Oct. 16, 1970

[21] Appl. No.: 81,230

[52] U.S. Cl............................174/77 R, 138/89, 174/35 CE, 174/99 R
[51] Int. Cl. ........................................................H02g 15/04
[58] Field of Search..............174/23 R, 35 CE, 65 SS, 77 R, 174/99 R, 100; 138/89; 277/12, 102, 188; 285/139

[56] References Cited

UNITED STATES PATENTS

| | | | |
|---|---|---|---|
| 1,851,940 | 3/1932 | Williams | 174/99 R X |
| 2,047,159 | 7/1936 | Wood et al. | 174/35 CE |
| 2,652,521 | 9/1953 | Westphal | 174/35 CE X |
| 3,020,329 | 2/1962 | Deans | 174/35 CE X |

FOREIGN PATENTS OR APPLICATIONS

| | | | |
|---|---|---|---|
| 1,087,038 | 8/1960 | Germany | 174/35 CE |
| 741,391 | 11/1955 | Great Britain | 174/65 SS |
| 780,993 | 8/1957 | Great Britain | 174/77 R |

*Primary Examiner*—Laramie E. Askin
*Attorney*—Harold S. Wynn and John P. DeLuca

[57] ABSTRACT

There has been provided a conduit cable seal comprising a clamping means having at least two relatively thin, spaced steel plates having axial holes therethrough for passing a cable and a radial slot extending from an outer end of each of the cable holes to the outer edge of the plates. A fastening means draws one plate close to the other and a resilient sealing member disposed between the plates seals the conduit beyond the cable seal when the fasteners urge the plates toward each other.

3 Claims, 2 Drawing Figures

Patented April 11, 1972

3,655,907

CONDUIT CABLE SEAL

Background of Invention

Generally, a conduit seal consists of some layers of resilient disks generally rubber disposed between two metal plates coupled by what are known as cap screws. Holes are pre-drilled or bored through the complete assembly to provide a passageway for the required number of cables. Tightening of the cap screws draws one plate closer to the other and compresses the rubber disks against the cable and the conduit wall. This forms a gas-tight seal at the end of the conduit. In general, the plates are non-magnetic material because high currents passing through the cables tend to induce eddy currents in the metal plates and heat the seals.

This type of seal, while effective for its desired purpose, has certain disadvantages noted below. A first shortcoming of such a system is that the metal plates used are generally aluminum or some other non-ferro-magnetic material and while adequate, must generally be relatively thick in order to provide sufficient strength to compress the rubber seal without buckling under the tightening of the cap screws. In addition, steel plates are easier to manufacture, cheaper to produce and require much less material for the required strength than does aluminum or some other material. Except for the problem of eddy currents produced about cables carrying electrical power, steel would seem to be ideal material for this application. Unfortunately, the heat generated by the eddy currents in the ferro-magnetic material and the attendant deterioration of this seal tend to limit the application of steel for this purpose.

It is therefore an object of the present invention to provide an arrangement which substantially obviates one or more of the limitations and disadvantages of the described prior arrangement.

It is another object of the present invention to provide a conduit cable seal easily and economically manufactured.

Summary of Invention

There has been provided a conduit cable seal comprising a clamping means having at least two relatively thin, spaced steel plates with axial holes therethrough for passing cable and a radial slot extending from an outer end of each of the cable holes to an outer edge of the plates. A fastening means draws one plate closer to the other. A resilient sealing member is disposed between the plates for sealing the conduit beyond the cable seal when the fasteners draw the plates together.

For a better understanding of the present invention, together with other and further objects thereof, reference is had to the following description taken in connection with the accompanying drawing, while its scope will be pointed out in the appended claims.

DESCRIPTION OF THE PREFERRED EMBODIMENT

Figure 1:
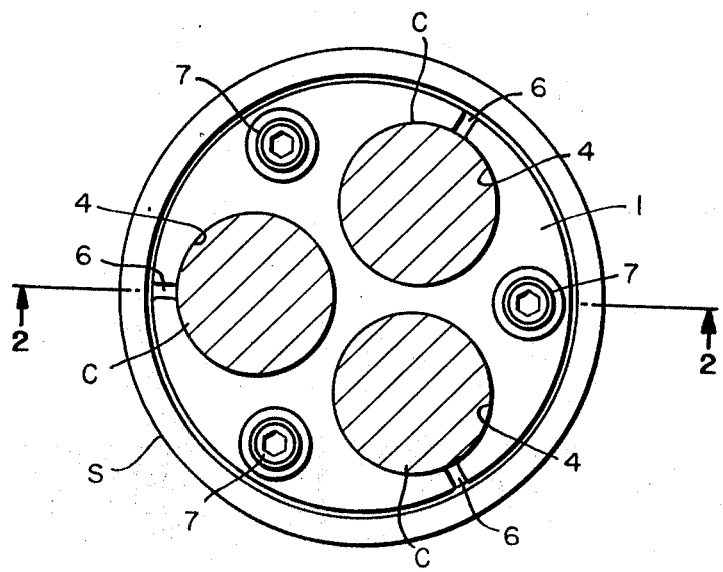
FIG. 1 is a top elevation of the conduit cable seal of the present invention.
Figure 2:
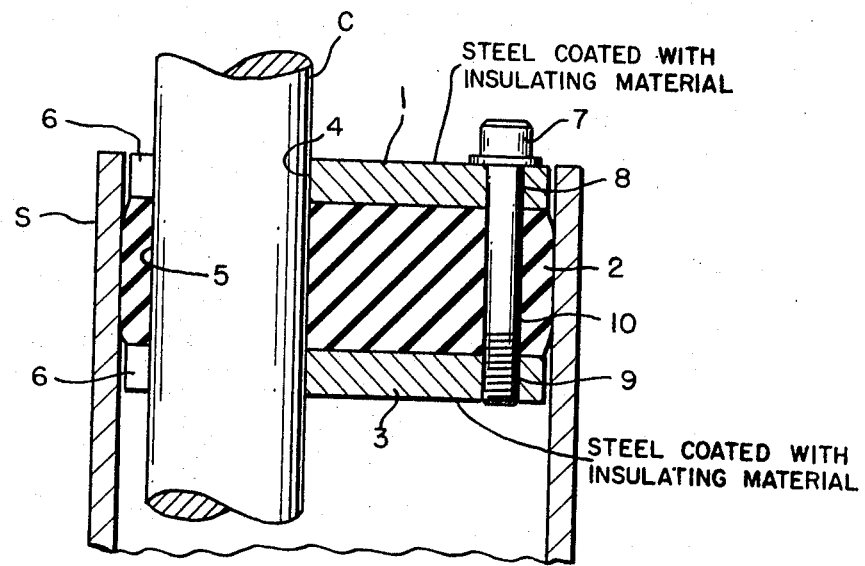
FIG. 2 is a side section elevation of the cable seal of FIG. 1 taken along line 2—2.

The conduit cable seal of the present invention illustrated in FIGS. 1 and 2 consists of two plates 1 and 3 having a sealing member 2 disposed between them and cap screws or bolts 7 passing through holes 8 in the top plate 1, through holes 10 in the rubber seal 2 and threaded into bolt holes 9 of the bottom plate 3. These bolts 7 when tightened down, draw the plates 1 and 3 together and compress the gasket or seal 2, thus urging the gasket 2 against conduit sleeve walls S. Holes 4 are drilled or pre-formed in the plates 1 and 3 and similarly holes 5 corresponding to the positions of the holes in the plates are drilled in the rubber seal 2 to allow the insertion of cables C. When, as previously described, the cap screws are tightened, the rubber seals the outer sheath of the cable C against the walls of the cylindrical hole 5 of the rubber seal 2.

The plates 1 and 3 are generally constructed of steel and are therefore relatively thin compared to other non-ferro-magnetic plates available. In order to eliminate the problem of eddy currents being induced in ferro-magnetic materials such as the steel disks 1 and 3, slots 6 are formed radially from the outer edge of each of the holes 4 in the plates to the edge of the plates. The eddy currents generally produced in the steel plates tend to circulate about the cable in the adjacent ferro-magnetic material. However, by providing the slot 6 about the holes 4 for each of the cables C, the main current path immediately about the cable in the plates in substantially eliminated.

The slots 6 also provide for increased flexibility of the steel plates 1 and 3. Each cap screw 7 can be tightened to a degree necessary for sufficiently sealing the seal against the conduit sleeve S, the cable C and the bolt holes 10. The necessity for various pressures of the cap screws 7 may occur due to many factors including differences in the cable diameter, irregularities in the manufacture of the plates 1 and 3, or the seal 2. In addition, upon installation, this arrangement would reduce the possibility of the seal being tightened askew of the axis of the sleeve S. The seal 2 as previously mentioned, is a solid block and this arrangement generally has been found to satisfy most applications. However, under certain circumstances, a plurality of sealing members may be stacked together to provide a function that the one piece seal 2 provides.

A further point to mention is the coating on the plates 1 and 3. They have been coated with polyvinyl chloride in this embodiment in order to provide an insulative barrier between the plates and the sleeve S. The purpose of the PVC coating is to insulate the plates 1 and 3 and break up a potential magnetic path between the plates and the conduit sleeve S. It would not be necessary to provide the coating, except for corrosion protection in the case where the sleeve S is of some non-ferro-magnetic material. However, in this embodiment, it has been found convenient to seal all the plates regardless of their application.

The present disclosure therefore provides for a conduit seal which utilizes components which are more desirable in terms of ease of manufacture and materials costs. The strength of the plates is substantially increased using half the normal thickness of ordinary aluminum or other non-ferro-magnetic material and key problems associated with eddy currents induced in steel have been eliminated by the provision of slots in the plates. In addition, the installation is facilitated by the flexibility introduced into the caps by the slots allowing the disks 1 and 3 to flex more readily under the various drawing pressures provided by the tightening of the cap screws 7.

While there has been described what is at present considered to be the preferred embodiment of the present invention, it will be obvious to those skilled in the art that various changes and modifications may be made therein without departing from the invention, and it is therefore aimed in the appended claims to cover all such changes and modifications that fall within the true spirit and scope of the invention.

What is claimed is:

1. A conduit cable seal including a cylindrical seal of insulating material having a plurality of openings formed therein for the passage of cables longitudinally through the seal wherein the improvement comprises;
    a. integral annular steel plates at both ends of the resilient seal for use in tightening the seal within a conduit,
    b. each of the plates having openings formed therein for passage of a plurality of cables through the plates as well as through the seal,
    c. each of the plates having radial slots formed therein extending from the periphery of the associated plate to the several openings for the cables, and
    d. a plurality of bolts connecting the plates and extending longitudinally through the cylindrical seal for clamping the seal between the plates within a conduit.

2. A conduit cable seal according to claim 1 wherein the plates are coated with an insulating material to insulate the plates from a metal conduit in which the seal may be inserted.

3. A conduit cable seal according to claim 2 wherein the insulating material is polyvinyl chloride.

* * * * *